United States Patent [19]

Cobb, Jr.

[11] Patent Number: 5,056,892
[45] Date of Patent: Oct. 15, 1991

[54] TOTALLY INTERNALLY REFLECTING THIN, FLEXIBLE FILM

[75] Inventor: Sanford Cobb, Jr., St. Mary's Point, Minn.

[73] Assignee: Minnesota Mining and Manufacturing Company, Saint Paul, Minn.

[21] Appl. No.: 472,621

[22] Filed: Jan. 30, 1990

Related U.S. Application Data

[63] Continuation of Ser. No. 218,087, Jul. 12, 1988, Pat. No. 4,906,070, which is a continuation of Ser. No. 903,655, Sep. 5, 1986, abandoned, which is a continuation-in-part of Ser. No. 799,869, Nov. 21, 1985, abandoned, and a continuation-in-part of Ser. No. 819,118, Jan. 15, 1986, abandoned.

[51] Int. Cl.$^5$ .................. G02B 5/04; G02B 5/124; G02B 5/136
[52] U.S. Cl. .................. 359/831; 359/528; 359/546
[58] Field of Search .................. 350/286, 287, 276 R, 350/616, 176, 167, 103, 104, 106, 109; 362/32, 339, 337

[56] References Cited

U.S. PATENT DOCUMENTS

| | | | |
|---|---|---|---|
| 2,175,067 | 10/1939 | Rolph | 240/106 |
| 2,218,227 | 10/1940 | Winnek | 13/61 |
| 2,232,551 | 2/1941 | Merton | 18/57 |
| 2,248,638 | 7/1941 | Merton | 156/10 |
| 2,279,555 | 4/1942 | Browne et al. | 88/24 |
| 2,723,919 | 11/1955 | Pohnan | 117/35 |
| 3,288,990 | 11/1966 | Stahlhut | 240/106 |
| 3,689,346 | 9/1972 | Rowland | 156/245 |
| 3,908,056 | 9/1975 | Anderson | 428/142 |
| 4,118,763 | 10/1978 | Osteen | 362/339 |
| 4,120,565 | 10/1978 | Rabl et al. | 350/286 |
| 4,154,219 | 5/1979 | Gupta et al. | 126/270 |
| 4,235,515 | 11/1980 | Sheiman et al. | 350/138 |
| 4,244,683 | 1/1981 | Rowland | 425/143 |
| 4,260,220 | 4/1981 | Whitehead | 350/96.28 |
| 4,389,085 | 6/1983 | Mori | 350/96.10 |
| 4,422,719 | 12/1983 | Orcutt | 350/96.30 |
| 4,466,697 | 8/1984 | Daniel | 350/96.30 |
| 4,497,860 | 2/1985 | Brady, Jr. | 428/156 |
| 4,576,850 | 3/1986 | Martens | 428/156 |
| 4,615,579 | 10/1986 | Whitehead | 350/96.1 |

FOREIGN PATENT DOCUMENTS 2127344 4/1964 United Kingdom .

Primary Examiner—Bruce Y. Arnold
Assistant Examiner—James Phan
Attorney, Agent, or Firm—Gary L. Griswold; Walter N. Kirn; Stephen W. Buckingham

[57] ABSTRACT

A thin, flexible film made of a transparent polymeric material including a structured surface and an opposite smooth surface, wherein light striking either surface, within certain angular ranges, is totally internally reflected. The structured surface includes a linear array of miniature substantially right angled isosceles prisms arranged side-by-side to form a plurality of peaks and grooves. In addition, the perpendicular sides of the prims make an angle of approximately 45° with the smooth surface, and when the film is curled the smooth surface lies in a smooth continuous arcuate curve without materially affecting the performance of the film. Because of the film's flexibility and its ability to totally internally reflect light, it may be utilized in a variety of ways, for example, as a collector of solar energy or as a light conduit. The performance of the film may be manipulated to permit controlled light leakage.

8 Claims, 4 Drawing Sheets

TOTALLY INTERNALLY REFLECTING THIN, FLEXIBLE FILM

Cross-References to Related Applications

This is a continuation of application Ser. No. 218,087 filed July 12, 1988, now U.S. Pat. No. 4,906,070 which was a continuation of application Ser. No. 903,655 filed Sept. 5, 1986, now abandoned, which was a continuation-in-part of applications Ser. No. 799,869 filed Nov. 21, 1985, now abandoned, and Ser. No. 819,118 filed Jan. 15, 1986, now abandoned.

FIELD AND BACKGROUND OF THE INVENTION

The present invention relates to a thin, flexible film made of a transparent material having a structured surface on one side and a smooth surface opposite the structured surface on the other side, one aspect of which is that the combination of surfaces may totally internally reflect light.

It is well known, to those skilled in the art, to form thin, flexible films structured on one side to deflect light, as illustrated in U.S. Pat. No. 2,248,638. In addition, mirrors have been used to reflect light and the making of mirrors is also well known to those skilled in the art as described in, for example, U.S. Pat. No. 2,723,919. However, there are limitations associated with the use of mirrors. Commercially available mirrors, even when new, have limited reflectivities that normally range from about 75% to about 95%, and, when, with the passing of time, the reflective coating becomes tarnished, the efficiency decreases.

The principle of total internal reflection has been recognized by optical engineers, as an alternative to mirrors, for many decades for reflectors and luminairs, as illustrated in U.S. Pat. Nos. 2,175,067 and 4,260,220. Its application can be found in various optical instruments, for example, the porro prisms in certain binoculars, the amici roof prisms used in certain types of periscopes, and the roof prisms used in certain types of single lens reflex cameras. However, such devices are massive and bulky.

The present invention affords an improved thin, flexible film made of a transparent material having a structured surface on one side which will achieve total internal reflection so that light, incident within certain angular ranges, is totally internally reflected. In addition, since the improved film requires no coating, it is capable of maintaining its efficiency over long periods of time. Finally, because of the film's flexibility, it can be formed into a variety of shapes and utilized in several ways.

SUMMARY OF THE INVENTION

The present invention provides a novel thin, flexible film made of a suitable transparent material, which has a structured surface on one side and a smooth surface opposite the structured surface on the other side. The structured surface consists of a linear array of miniature substantially right angled isosceles prisms arranged side-by-side to form a plurality of peaks and grooves. When the film is in a planar position, the perpendicular sides of each prism make an angle of approximately 45° with the smooth surface opposite the structured surface. In addition, when the film is curled or arched, the smooth surface lies in a smooth continuous arcuate curve and incident light striking the concave side of the film, within certain angular ranges, is totally internally reflected.

The ability to maintain reflectivity when the smooth surface lies in an arcuate curve results in the film being able to be utilized in a variety of ways. For example, the flexibility of the film allows it to be used as a concentrator of solar energy when applied onto a trough.

A particular advantage of the film's flexibility is that it can be formed into a conduit or optical tunnel having a variety of cross-sectional shapes with the linear array of right angled isosceles prisms disposed parallel, orthogonally, or at any angle to the axis of the conduit. However, light will only be totally internally reflected and transported along the conduit if it is properly directed into the conduit. Further, the performance of the conduit can be manipulated so that the conduit acts as an illuminator by permitting a controlled amount of light leakage.

DESCRIPTION OF THE DRAWINGS

The present invention will be more fully described with reference to the accompanying drawings wherein like reference numerals identify corresponding components, and.

DETAILED DESCRIPTION OF A PREFERRED EMBODIMENT

Figure 1A:
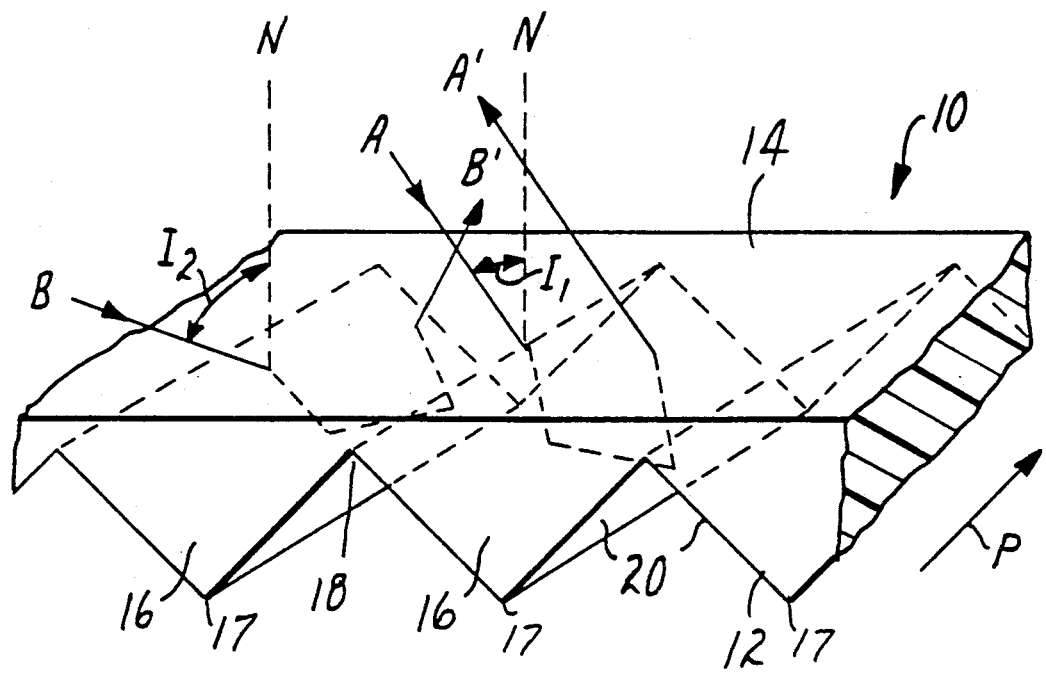
FIGS. 1A and 1B are enlarged perspective views of the film of the present invention.
Figure 1B:
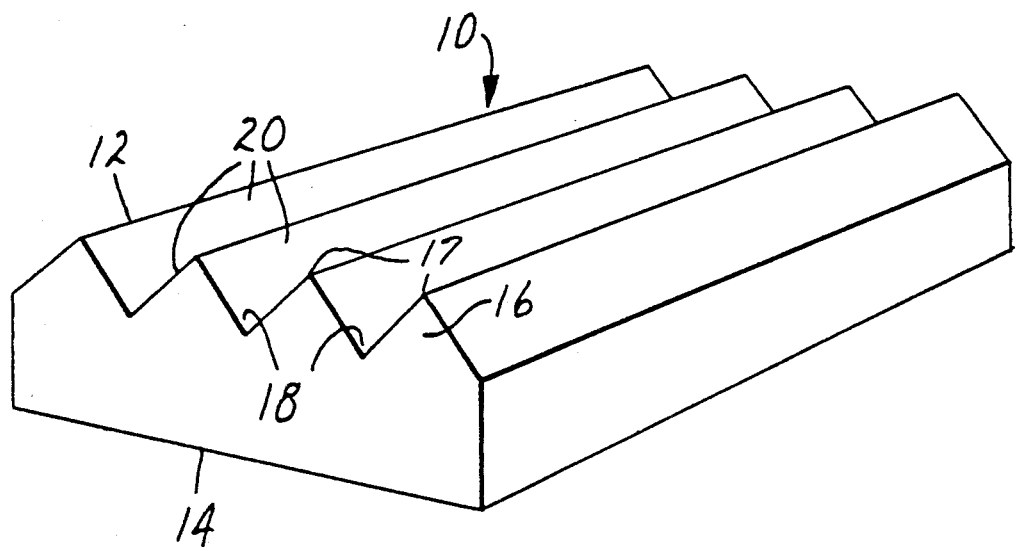
Figure 2:
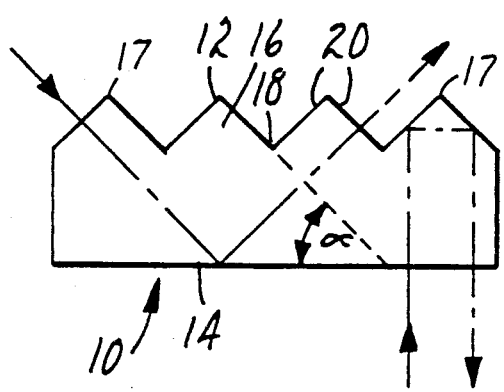
FIG. 2 is a schematic end view of the film of the present invention.
Figure 3:
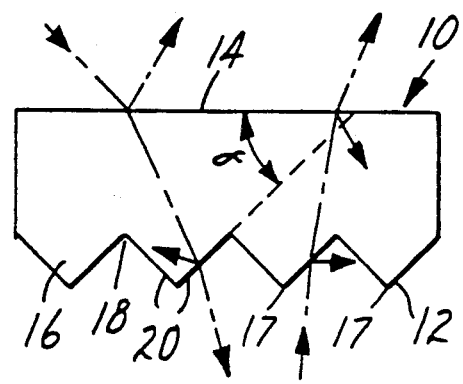
FIG. 3 is an inverted end view of FIG. 2.

Referring to FIGS. 1A and 1B of the drawings, the thin, flexible film of the present invention, generally designated 10, is comprised of a transparent polymeric material having a structured surface 12 on one side and a smooth surface 14 opposite the structured surface on the other side. Incident light striking either of the surfaces 12 or 14, within certain angular ranges, will be totally internally reflected at the other surface, as illustrated in FIG. 2. The light will be totally internally reflected when the light refracted by the first surface strikes the second surface at an angle, with respect to the normal, greater than the critical angle. This critical angle, in air, is defined as the arc sine of the reciprocal of the index of refraction of the material. In addition, a significant portion of the incident light striking either of the surfaces 12 or 14, outside those angular ranges, will be transmitted and the remainder will be reflected, as illustrated in FIG. 3. In either situation, there is negligible absorption of light by the material.

Figure 4:
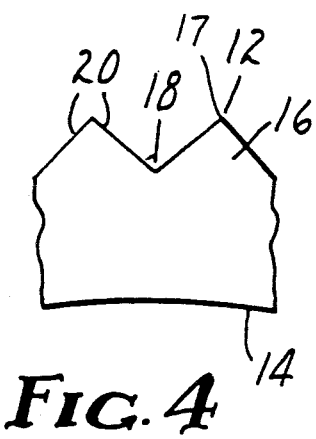
FIG. 4 is an exaggerated view similar to FIG. 2 depicting the film when it is curled into a smooth continuous arcuate curve.
Figure 5:
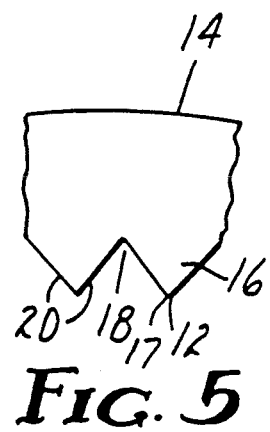
FIG. 5 is an exaggerated view similar to FIG. 3 depicting the film when it is curled into a smooth continuous arcuate curve.

The structured surface 12 includes a linear array of miniature substantially right angled isosceles prisms 16 arranged side-by-side in parallel relationship to form a plurality of peaks 17 and grooves 18 running the length of the film 10, as illustrated in FIGS. 2 and 3. The perpendicular sides 20 make an angle alpha ($\alpha$), of approximately 45°, with the adjacent smooth surface 14 when the film is in a planar position. In addition, when the film 10 is curled such that the smooth surface 14 lies in a continuous arcuate curve, the angle alpha ($\alpha$) varies from 45° and the sides 20 curve due to compression or tension, as illustrated in FIGS. 4 and 5. It has been found that these conditions do not significantly affect the performance of the film 10 in many applications.

The particular material used for the film 10 may vary, but it is intended that the material be normally flexible, and yet may not have sufficient strength to be self supporting in particular applications. The flexibility of the film 10 can best be defined as the ability to be curled so that the smooth surface 14 is a smooth continuous arcuate curve having no discernable discontinuities, such as kinks, fractures, segments, or the like. It is, however, essential that the material be transparent, and preferably homogeneous and isotropic. Useful polymeric materials for this purpose are commercially available, for example, acrylics and polycarbonates having nominal indices of refraction of 1.493 and 1.586, respectively. Other useful polymers are polypropylene, polyurethane, polystyrene, polyvinyl chloride, and the like. The particular polymeric material selected is not significant to the invention hereof, so long as it provides the described function. Normally, the manufacturers of this product will select the best commercially available polymeric material based upon price, application and manufacturing process. However, polycarbonates are of particular interest because of their high indices of refraction and physical properties.

There are several ways to continuously mass produce the film of the present invention which are well known to those skilled in the art, for example as illustrated in U.S. Pat. Nos. 3,689,346, 4,244,683, 4,576,850 and U.K. Patent Application No. GB2,127,344A, the disclosures of which are hereby incorporated by reference. In addition, previous methods for mass producing rigid sheets have also included compression molding, casting or calendering. The particular manufacturing process is not essential to the present invention, and is a matter of choice based upon economics and availability.

The thickness of the film is essential to the present invention because the performance and applicability of the film are dependent upon its flexibility so that the film 10 may be curled into a variety of shapes, such as tubular or cylindrical. An approximation for the minimum cylindrical diameter D to which a particular film having a thickness T, as measured from the smooth surface 14 to the valley of the grooves 18, may be curled is determined by the equation: D-T·C, where C is a constant associated with the modulus of elasticity of the particular material. When the prisms 16 are micro in size, at least 40 per inch, and the film 10 has a particular thickness T, it may be curled such that the smooth surface 14 will lie in a smooth continuous arcuate curve. while maintaining total internal reflection. It has been determined that an acrylic film having prisms micro in size has a constant C of about 200 associated therewith. For example, a 0.015 inch thick acrylic film having about 70 prisms per inch will exhibit sufficient flexibility to be capable of being easily curled into a cylinder having a minimum diameter of approximately 3 inches, while maintaining a smooth continuous arcuate surface without breaking. In addition, such a film will be rigid and self-supporting enough to easily maintain its shape when curled into a cylinder having a diameter of approximately 18 inches. This ability to maintain reflectivity results in the film being able to be utilized in a variety of ways, and eliminates the prior requirement that the optically active surface be rigidly maintained in planar configuration as taught by U.S. Pat. No. 4,260,220.

As illustrated in FIG. 1A, a light ray A incident on the smooth surface 14, at an angle $I_1$ made with the normal N to the smooth surface 14, is refracted and totally internally reflected at the structured surface 12. The light ray A and the normal N both lie in a plane that is perpendicular to the direction P in which the linear array of prisms 16 of the structured surface 12 lie. Light ray A will be totally internally reflected and emerge as reflected light ray A' still lying in that same plane. Similarly, another light ray B, incident on the smooth surface 14 at an angle $I_2$ in a plane not perpendicular to the direction P, is illustrated. The incident light ray B is internally reflected and emerges as light ray B' in another plane defined by the incoming light ray B and the prism direction P.

APPLICATION AND USE

Figure 6:
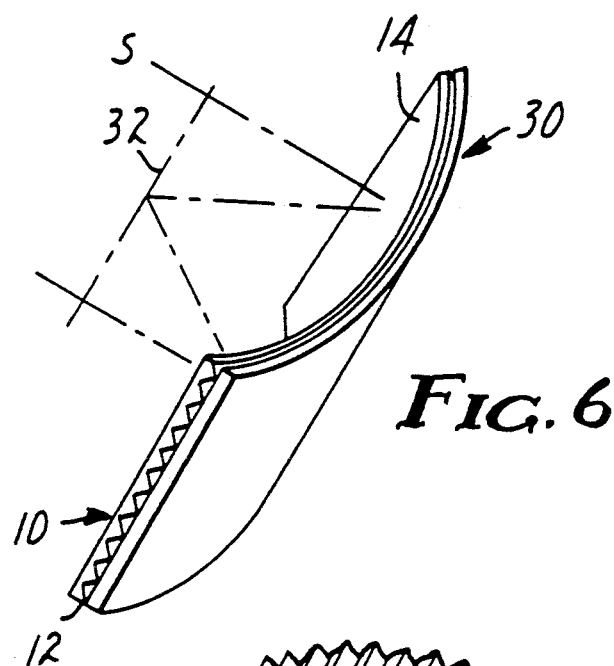
FIG. 6 is a perspective view of a parabolic solar energy concentrating trough utilizing the film of the present invention.

Several of the various applications and uses of the film 10 of the present invention will now be described. For example, the film 10 may be attached to a parabolic trough 30 made of a hard rigid material which supports the film 10 to form a concentrator of solar energy, as illustrated in FIG. 6. Thus, solar energy S incident upon the smooth surface 14 is totally internally reflected and emerges focused on the linear target 32.

Figure 7:
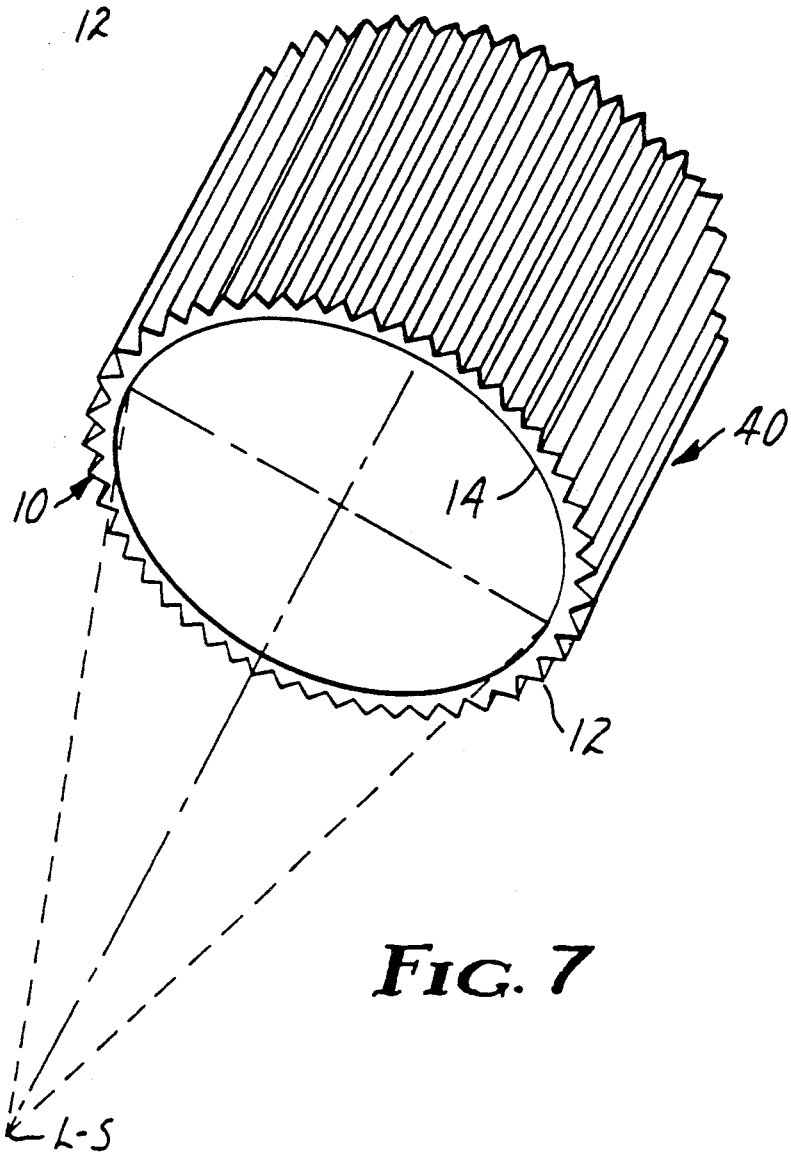
FIG. 7 is a perspective view of a light conduit utilizing the film of the present invention.

The most promising and revolutionary use of the film 10 is its ability to be formed into a tubular light conduit 40, whereby the smooth surface 14 lies in a smooth continuous arcuate curve, as illustrated in FIG. 7. Further, as illustrated in FIGS. 4 and 5, the conduit 40 may be formed with the structured surface 14 on the inner concave surface or on the outer convex surface. Thus, light can be directed into the conduit 40, as illustrated in FIG. 7, by a light source L-S, and a predetermined portion of the light, dependant upon the size and placement of the light source, will be contained by internal reflection and will emerge from the other end when the prisms 16 are disposed parallel to the axis of the conduit 40.

Figure 8:
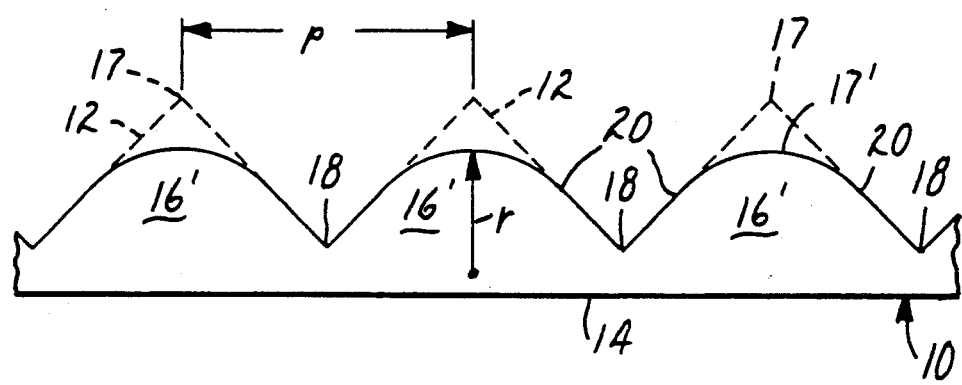
FIG. 8 is a schematic end view of the film of the present invention having rounded peaks to permit light leakage.

The performance of the conduit 40 may be manipulated by adding diffusing particles, or by incorporating windows or imperfections, such as non-optically smooth prism sides and/or non-optically sharp corners or peaks, so that the light conduit 40 acts as an illuminator by permitting controlled light leakage. To permit controlled light leakage, the peaks 17, which are normally razor sharp for light transportation, may be blunted or rounded as illustrated in FIG. 8. The amount of light leakage per reflection is of the order r/p, where r is the approximate radius of the round peak 17' of the prisms 16' and $\rho$ is the groove period. Thus, by varying the radius r of the peaks 17', light leakage can be controlled. It is preferred that this be accomplished without any post-production or conversion operation, which for example may require additional or specialized dies or tooling, or by varying parameters in the manufacturing process. This has proved both effective and economical by varying the following parameters to control replication and the rounding of the peaks: (1) die temperature; (2) die pressure; (3) line speed; (4) tooling temperature;

(5) cooling rate; (6) polymer dopants, etc. If the manufacturing process is other than extrusion, other parameters may apply.

While a preferred embodiment of the present invention has been described so as to enable one skilled in the art to practice the techniques of the present invention, the preceding description is intended to be exemplary and should not be used to limit the scope of the invention. The scope of the invention should be determined only by reference to the following claims.

What is claimed is:

1. A thin, flexible film of a transparent polymeric material, comprising a structured surface on one side and a smooth surface opposite said structured surface on the other side, said structured surface includes a linear array of miniature isosceles prisms having substantially perpendicular sides arranged side-by-side to form a plurality of peaks and grooves said film having at least 40 of said prisms per inch, the perpendicular sides of said prisms make an angle of approximately 45° with said smooth surface opposite said structured surface, said film being capable of being curled such that said smooth surface lies in a smooth continuous arcuate curve having a diameter of approximately 18 inches.

2. The film defined in claim 1, wherein the film does not have sufficient strength to be self-supporting.

3. The film defined in claim 1, wherein said transparent polymeric material is polycarbonate.

4. The film defined in claim 1, wherein said transparent polymeric material is acrylic.

5. The film defined in claim 1, wherein incident light striking the smooth surface within certain angular ranges is totally internally reflected.

6. The film defined in claim 1, wherein incident light striking the structured surface within certain angular ranges is totally internally reflected.

7. The film defined in claim 1 wherein said film has a thickness of approximately 0.015 of an inch and about 70 prisms per inch so that when said film is curled said smooth surface lies in a smooth continuous arcuate curve without any discernible discontinuities.

8. A thin, flexible film of a transparent polymeric material, comprising a structured surface on one side and a smooth surface opposite said structured surface on the other side, said structured surface includes a linear array of miniature isosceles prisms having substantially perpendicular sides arranged side-by-side to form a plurality of peaks and grooves, the perpendicular sides of said prisms make an angle of approximately 45° with said smooth surface opposite said structured surface, said film being capable of being curled such that said smooth surface lies in a smooth continuous arcuate curve having a diameter of approximately 18 inches and said film does not have sufficient strength to be self-supporting.

* * * * *